Patented June 12, 1923.

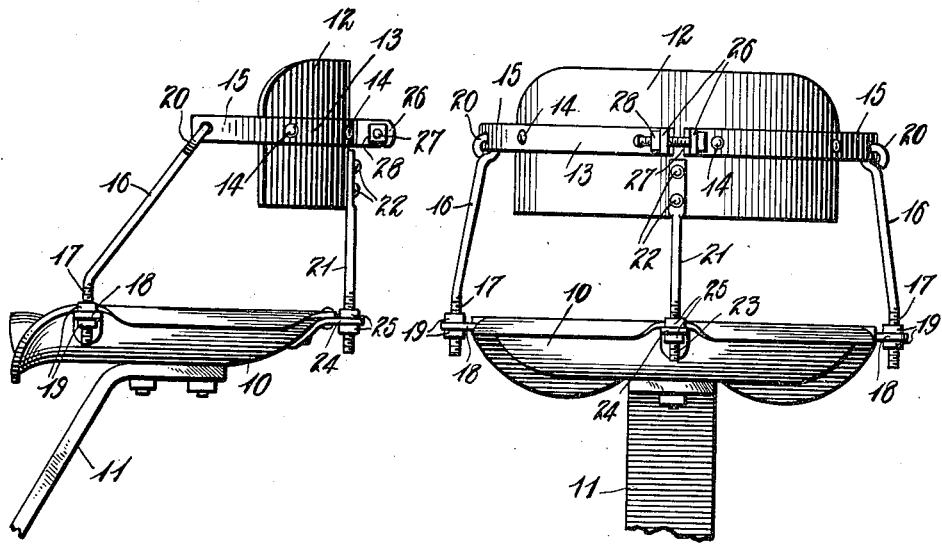

1,458,879

UNITED STATES PATENT OFFICE.

JOSEPH P. GARVER, OF CHARLESTON, ILLINOIS.

ADJUSTABLE SEAT BACK.

Application filed August 24, 1922. Serial No. 584,049.

*To all whom it may concern:*

Be it known that I, JOSEPH P. GARVER, a citizen of the United States, and a resident of Charleston, in the county of Coles and State of Illinois, have invented certain new and useful Improvements in an Adjustable Seat Back, of which the following is a specification.

This invention relates to an adjustable seat back and has for its object to provide such a seat particularly adapted for use in connection with farm machinery such as tractors, mowing machines, riding cultivators, hay racks and the like. It will be obvious as the description proceeds that the seat may be employed with equal facility in other connections.

It has been found desirable particularly in farming machinery to provide a seat having a back rest or support, thus alleviating fatigue to the operator. Furthermore, it is essential in many types of farming machinery where it is necessary to move different levers and manipulate the feet and legs in the operation of the machinery to provide a back against which the operator may brace himself. This invention therefore provides this desired support.

Furthermore it is desirable to provide a seat having a back which is adjustable so as to accommodate the same to various sizes of persons thus rendering the seat comfortable in each instance. My invention therefore contemplates a structure whereby the seat back may be made adjustable as the occasion may demand.

With these objects in view the invention consists in the novel combination, construction and arrangement of parts more fully hereinafter described and illustrated in the accompanying specification and drawings.

In the drawings:

Fig. 1 is a side elevation of a seat constructed in accordance with my invention, Fig. 2 is a rear elevation of the same, and Fig. 3 is a top plan view partly in section.

Referring now more particularly to the drawings wherein like reference characters indicate like parts, it will be noted that there is provided a seat 10 which is of the usual construction in tractors, mowing machines and other types of farming machinery and which is supported upon the piece of farming machinery by a support 11.

The back 12 is formed of a sheet of resilient material such as sheet metal or the like and is curved as shown to conform to the contour of the back of the user. Secured thereto is a pair of strap-like braces 13, attachment being preferably made by rivets 14 or the like. The forward ends 15 of these braces extend beyond the forward edge of the back 12 and are apertured for the reception of the hooked end of a pair of rods 16. These rods are each provided with an angularly bent threaded end 17 which passes through eyes 18 riveted to the seat 10 adjacent the front thereof. A pair of nuts 19 are threaded onto the ends 17 of the rod 16 above and below the eye or lug 18. It should be noted that the hooked end 20 of each rod 16 provides a pivotal connection between the strap-like braces and the rods 16.

Disposed approximately centrally of the back 12 is a single brace rod 21 riveted to the back as at 22 and provided with a threaded end 23 which passes through an eye or lug 24 riveted to the seat 10 at the rear thereof. A pair of lock nuts 25 are threaded on to the end 23 of the rod 21 and are disposed above and below the lug 24 as clearly illustrated.

The rear ends of the strap-like braces 13 are bent to form angular projections 26 which are disposed at an angle of approximately 40° to the body of the strap-like braces. These angular projections are apertured for the reception of an adjusting bolt 27 provided with a nut 28.

The purpose of the adjusting bolt 27 is to flex the back 12 in the manner illustrated in dotted lines in Fig. 3 so as to accommodate the back to persons of a larger size. Obviously by tightening the nut 28 the angular ends 26 will be drawn together and owing to the rigid connection between the strap-like braces 13 and the back 12 the said back will be flexed or sprung, the ends moving outwardly and enlarging the circular contour so that the back may more readily accommodate the back of a person of larger proportions. Because of its resiliency by releasing the nut 28, the back will tend to assume its normal position and the forward ends thereof will move toward one another to reduce the transverse size of the same. This flexing of the back is permitted by the pivotal connection between the straps 13 and the rods 16.

Ofttimes it will be found desirable to elevate the back 12 so that it may engage the body of the operator at a higher point and for accomplishing this, the nuts 19 arranged on the ends of the rods 16 and the nuts 25 arranged on the end of the rod 21 may be adjusted so as to move the back 12 away from or toward the seat 10 as will be immediately apparent.

Without a further description it will be apparent that there is provided a seat having an adjustable back which may be quickly and conveniently adjusted either as to height or as to breadth. It should also be noted that the standard type of farm implement seats such as illustrated herein may be modified to such an extent as to accommodate the adjustable back, therefore broadening the utility of this invention in that the same may be connected to farm implement seats already in use. While the seat and back have been illustrated and described as made entirely of metal, it will be apparent that other materials may be substituted without sacrificing any of the advantages prevalent in this invention, and consequently the seat may therefore be adapted for many other apparatuses besides for use in connection with farming machinery.

Therefore I reserve the right to make such changes in details of construction and selection of material as may come within the purview of the accompanying claims.

Having thus described the invention, what I claim is:

1. The combination with a seat of a back, means for connecting said back to said seat, a pair of strap-like members provided with angular ends secured to said back and an adjusting bolt for engaging the angular ends of said straps for flexing said back.

2. The combination of a seat with a back, means comprising adjustable rods for connecting said back to said seat whereby said back may be spaced adjustably from said seat, straps secured to said back and provided with a pair of spaced angular ends, an adjusting bolt passing through said angular ends and adapted to draw said ends together to flex said back.

3. As an article of manufacture a seat provided with an adjustable back, said back comprising a sheet of flexible material, straps secured to said back and provided with a pair of angularly bent spaced ends, an adjusting bolt passing through said ends for causing said ends to be drawn together whereby said back may be flexed and adjustable rods connecting said back to said seat.

4. As an article of manufacture a seat provided with an adjustable back, said back comprising a sheet of flexible material, straps secured to said back, a pair of rods secured to the ends of said straps and adjustably connected to said seat whereby the height of said back may be varied and means cooperating with said straps for flexing said back.

5. As an article of manufacture a seat provided with an adjustable back, said back comprising a sheet of flexible material curved to conform to the contour of a person's body, a pair of rigid straps secured to said back, said straps extending beyond the forward edges of said back, rods pivotally secured to the ends of said strap, means adjustably securing the other end of said rods to said seat whereby the height of said back may be varied and means for moving said straps to flex said back.

6. In an arrangement of the class described, a seat, a back consisting of a sheet of spring metal curved to conform to the contour of a person's back, a pair of rigid straps secured to said back and projecting beyond the forward edges thereof, a pair of rods pivotally secured to the said ends of the straps, apertured lugs secured to said seat, said rods being formed with threaded ends passing through said lugs and adjusting nuts on said threaded ends and engaging said lugs, said straps being formed with spaced angular ends, an adjusting bolt extending through said ends whereby said ends may be drawn together to flex said back and a supporting rod connecting the rear of said back to the rear of said seat, said rod being vertically adjustable.

JOSEPH P. GARVER.